April 11, 1950          H. A. SNOW          2,503,851
ELECTRICAL GAUGE
Filed June 20, 1944          6 Sheets-Sheet 1
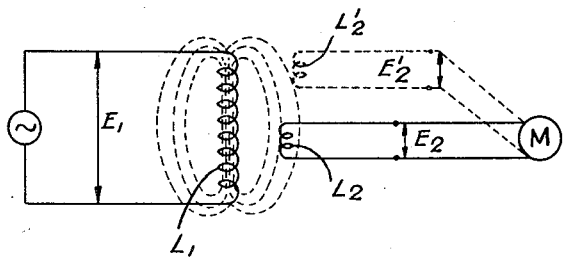
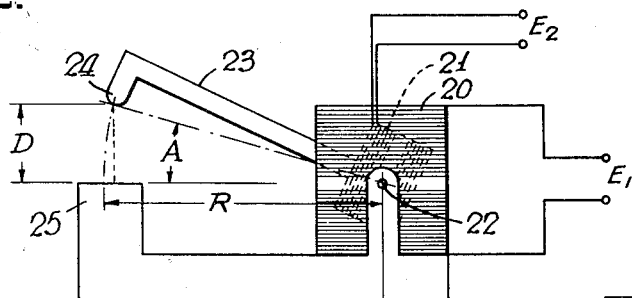
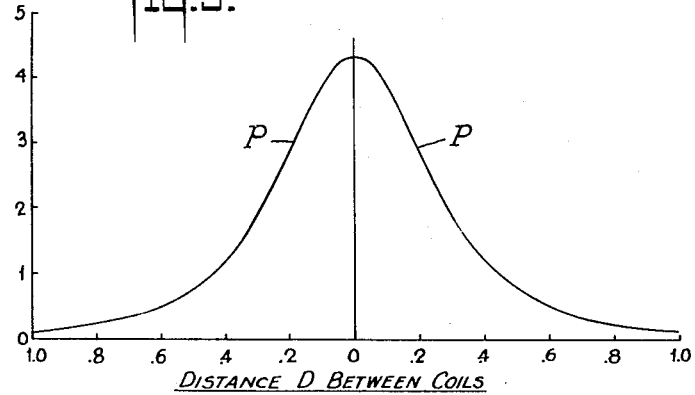
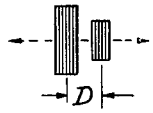
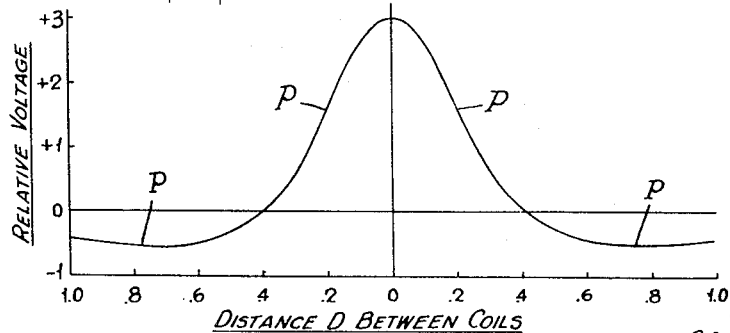
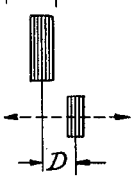
INVENTOR
*Harold A. Snow*
BY
*Blair, Curtis + Hayward*
ATTORNEYS April 11, 1950
H. A. SNOW
2,503,851
ELECTRICAL GAUGE
Filed June 20, 1944
6 Sheets-Sheet 2
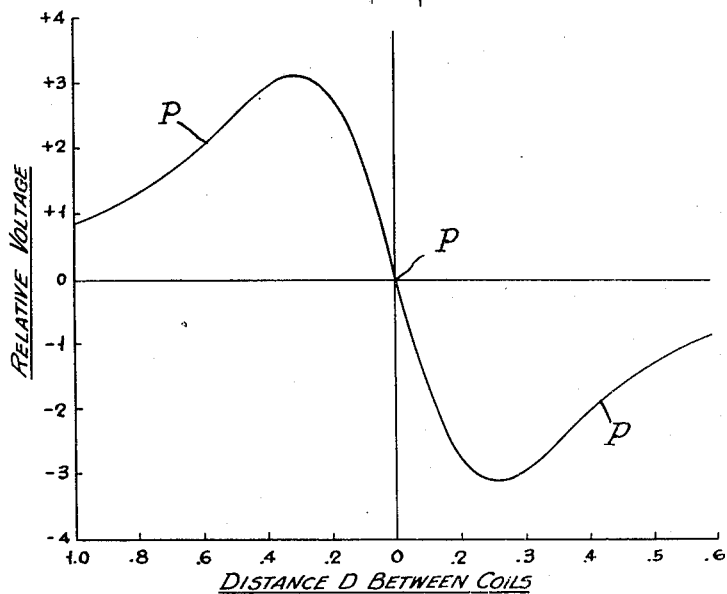
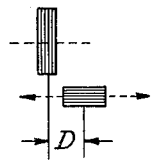
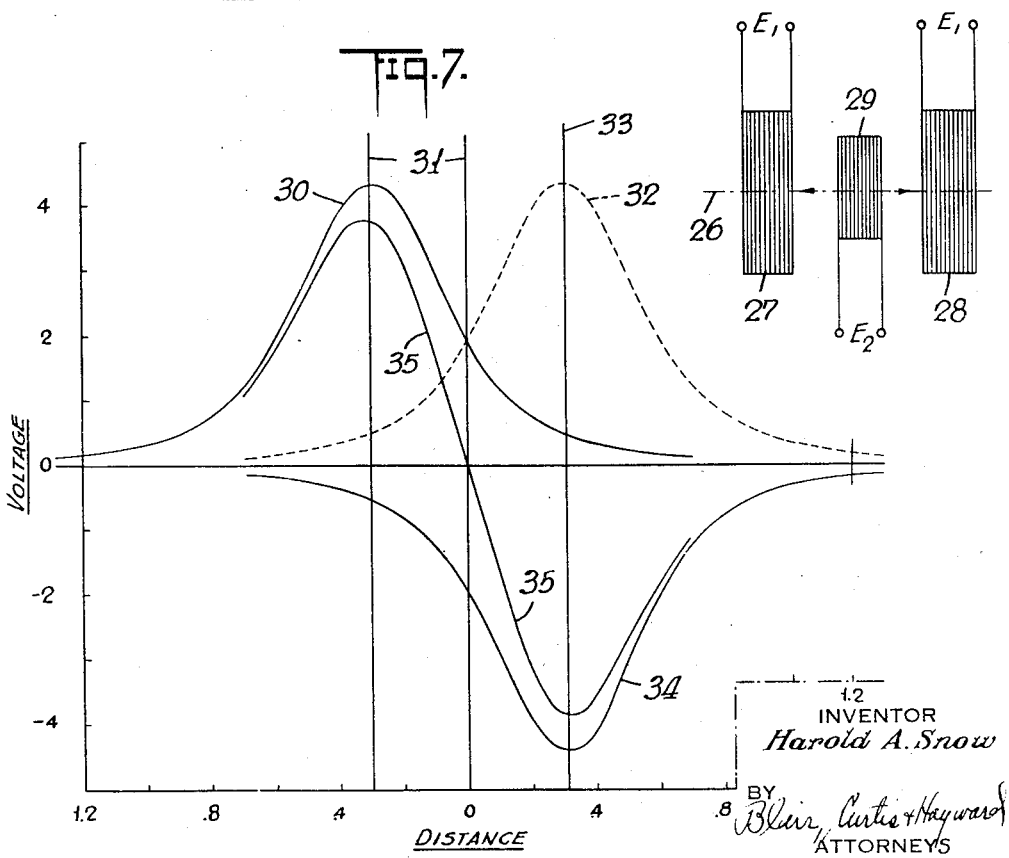
INVENTOR
*Harold A. Snow*
BY *Blair, Curtis & Hayward*
ATTORNEYS April 11, 1950  H. A. SNOW  2,503,851
ELECTRICAL GAUGE
Filed June 20, 1944  6 Sheets-Sheet 3
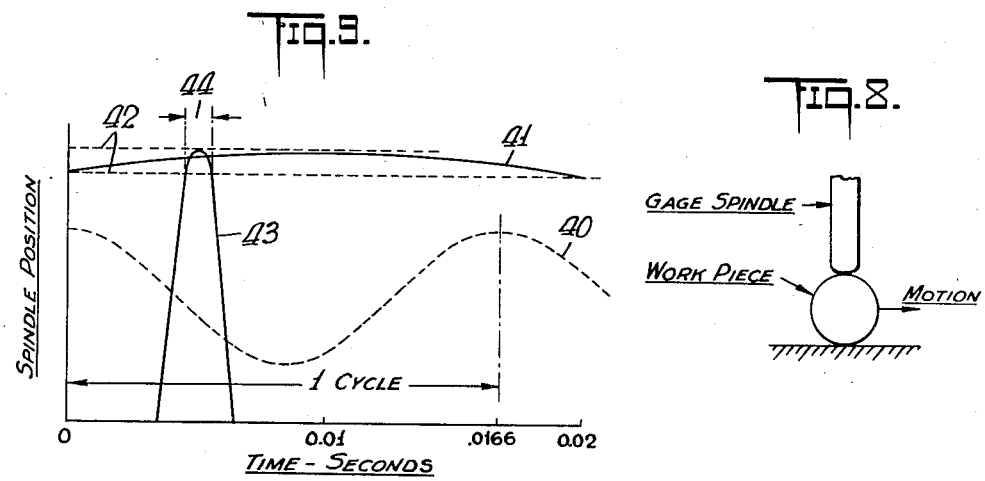
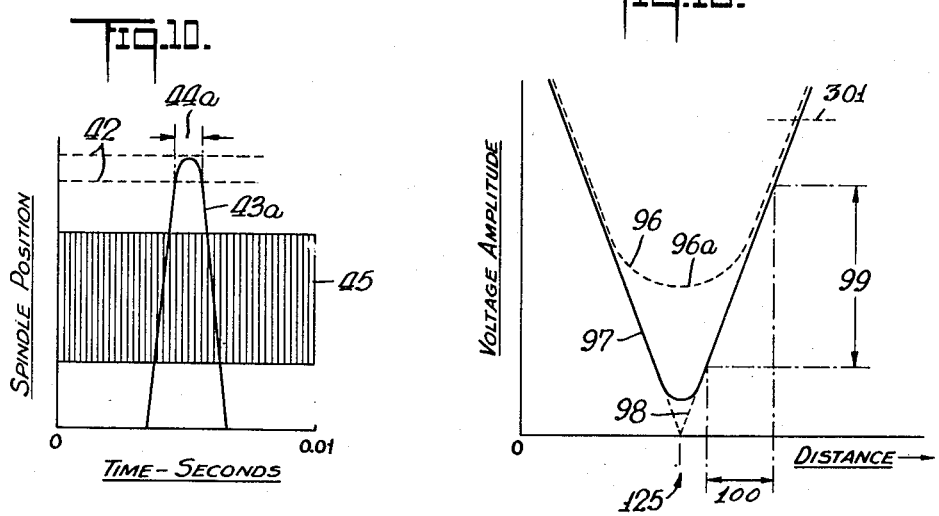
INVENTOR
*Harold A. Snow*
BY
*Blair, Curtis & Hayward*
ATTORNEYS April 11, 1950 H. A. SNOW 2,503,851
ELECTRICAL GAUGE
Filed June 20, 1944 6 Sheets-Sheet 4
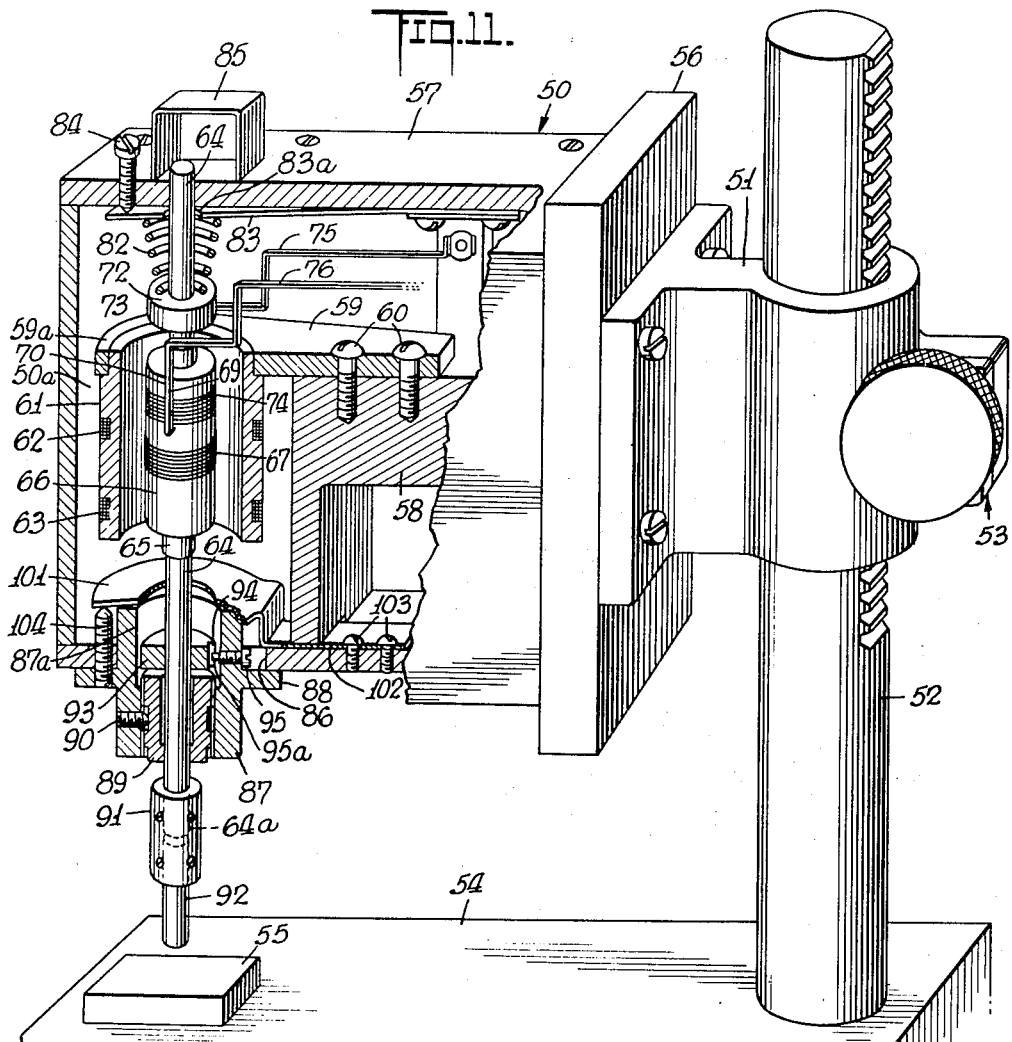
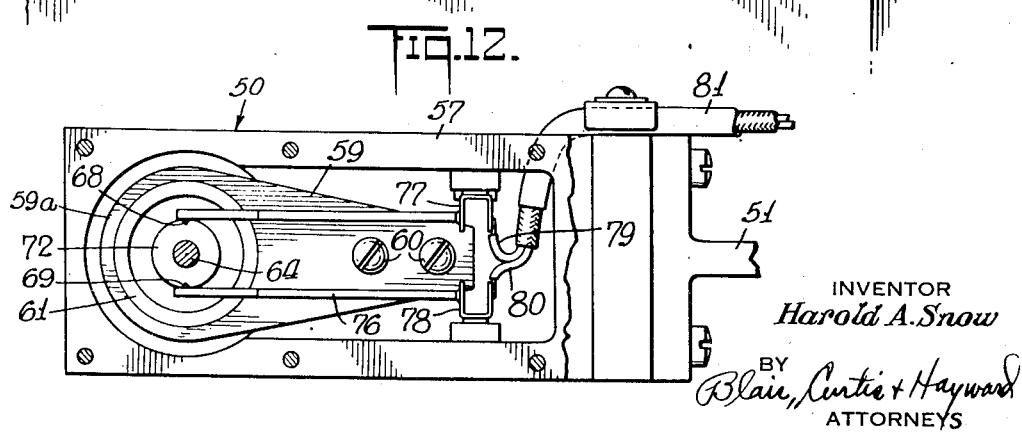
INVENTOR
Harold A. Snow
BY Blair, Curtis & Hayward
ATTORNEYS

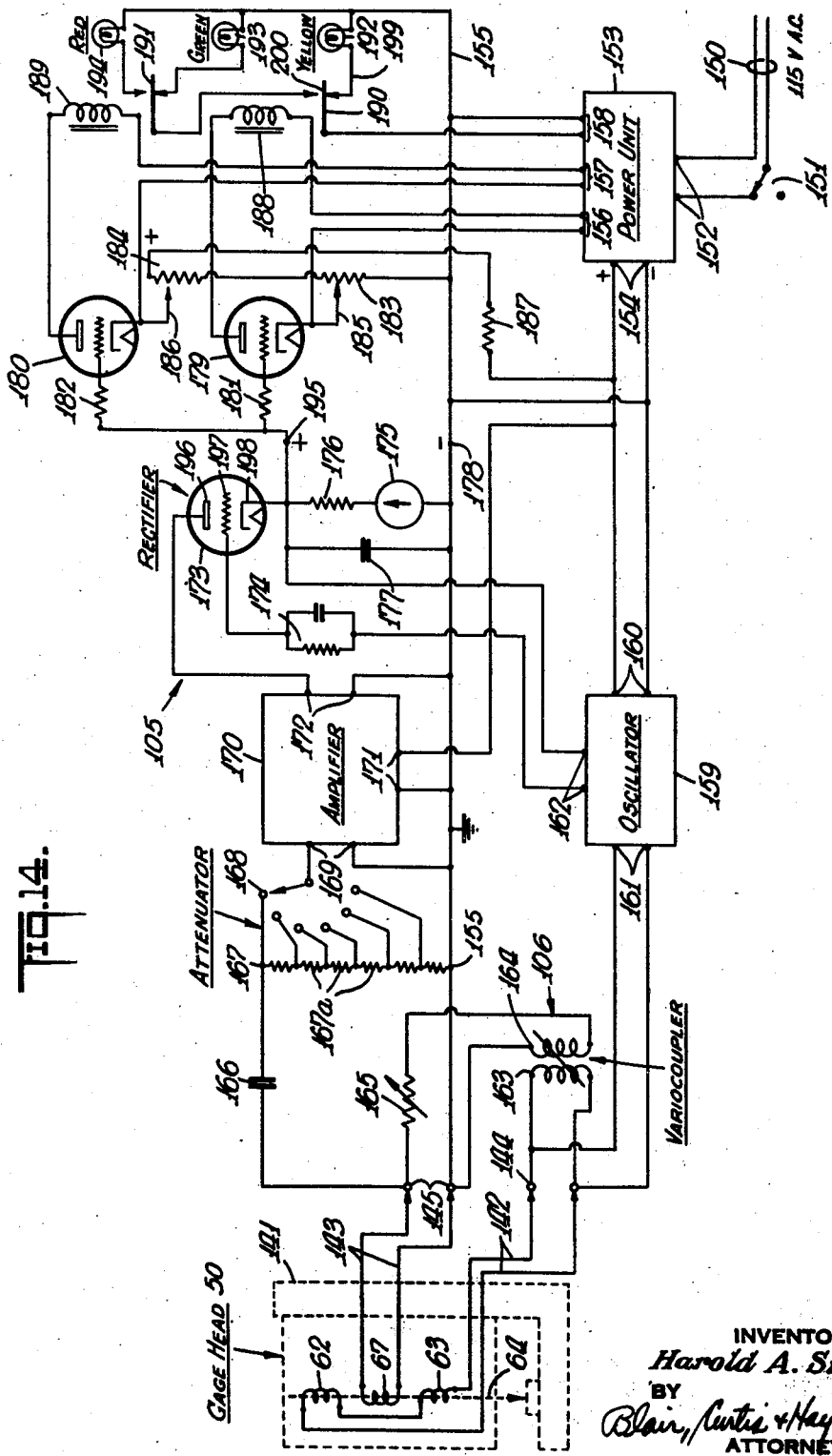

April 11, 1950     H. A. SNOW     2,503,851
ELECTRICAL GAUGE
Filed June 20, 1944     6 Sheets-Sheet 6
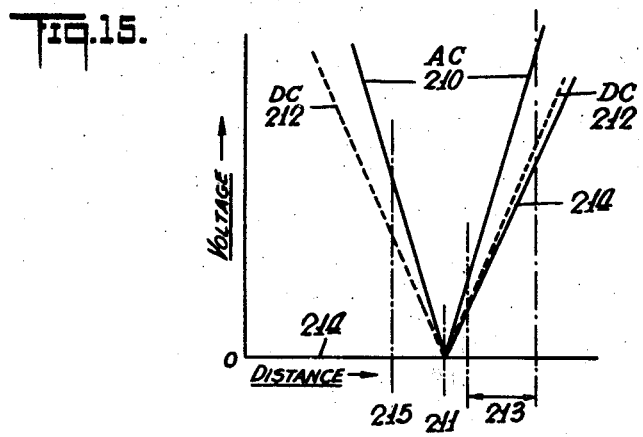
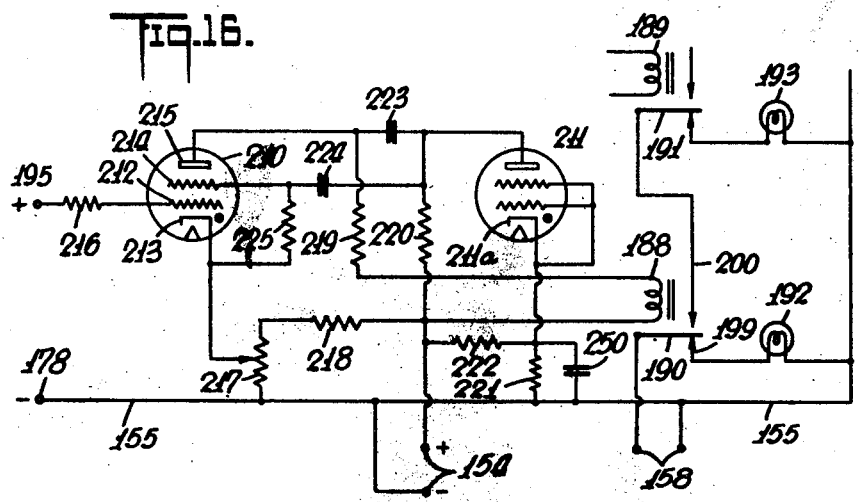
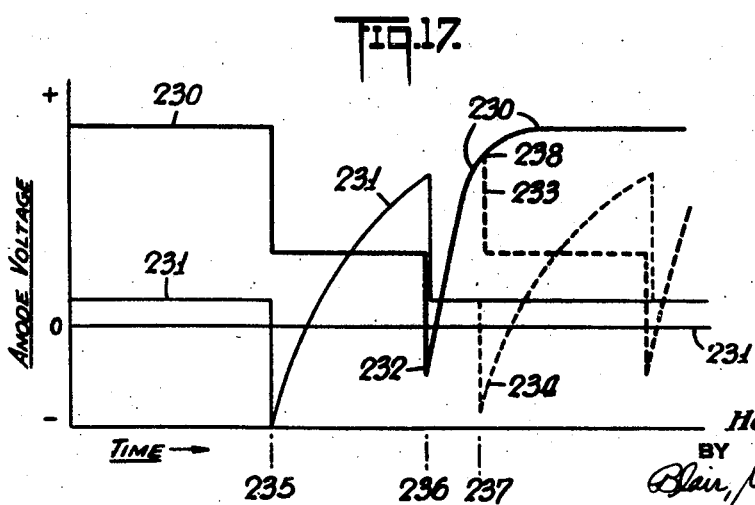
INVENTOR
*Harold A. Snow*
BY
*Blair, Curtis & Hayward*
ATTORNEYS Patented Apr. 11, 1950

2,503,851

UNITED STATES PATENT OFFICE 2,503,851

ELECTRICAL GAUGE

Harold A. Snow, West Orange, N. J., assignor, by mesne assignments, to Federal Products Corporation, Providence, R. I., a corporation of Rhode Island Application June 20, 1944, Serial No. 541,201

13 Claims. (Cl. 177—351)

This invention relates to a method of and apparatus for determining the value of a condition, or the value of a variation from a standard condition, more particularly to a method of and apparatus for measuring distance as, for example, measuring the dimensions of an article, or comparing the dimensions thereof with a standard.

Many articles of manufacture and many industrial processes involve the precise measurement or determination of the value of a condition such as size, distance, strain, pressure, hardness, etc. Hardness, for example, may be determined by measuring the penetration of a point into a material for a small distance under suitable applied pressure; strain due to applied stress or pressure may be determined by measuring a small change in length or position caused by application of the stress or pressure to a body. These and other values requiring the measurement of distances of a few thousandths of an inch or less with high accuracy must often be determined in controlling the characteristics of many manufactured products, or the operation of various industrial processes.

Where, for example, size or dimensions must be determined with high precision to within a few ten thousandths of an inch or less, conventional methods and devices have inherent limitations which restrict their field of use or their efficiency and accuracy. For example, mechanical methods of magnification with gears, levers and couples are restricted in maximum accuracy by the limitations of accurate construction, by reason of the necessary tolerances in the mechanical parts. Optical methods, such as those characterized by optical levers, are quite limited in magnification, while interference methods do not provide a simple and direct indication of size capable of being operated by inexperienced personnel. Although electrical methods are in general less restricted than others, because of the wide range of magnification available, and the variety of available existing principles which may be used to translate a distance into an electrical value, the electrical methods heretofore used for accurate measurement are, for the most part, restricted in their application in practical equipment, owing to inherent limitations of the methods.

Industrial measurement requirements vary according to the character of the workpiece being produced. For example, in the manufacture of gauge blocks it is necessary to determine the size of the block with an accuracy of the order of a few millionths of an inch or less. Even high precision production workpieces often necessitate sizing with an accuracy of a few hundred thousandths of an inch in order to fulfill tolerance requirements. Where the measurement requirements do not necessitate sizing to such small fractions of an inch there are often other problems such as classification of pieces which vary in size over a range of a few thousandths or hundredths of an inch.

A gauge capable of meeting the requirements of such industrial measurements should have certain characteristics. First the gauge should be capable of evaluating size of a wide variety of materials and shapes in different ranges of fractions of a unit of measurement, for example, in hundredths, thousandths, and ten-thousandths of an inch, and should be readily adjustable to any required accuracy of measurement. Secondly, such a gauge should be characterized by high speed of response, so as to make possible, for example, the inspection of a maximum number of workpieces per unit of time, particularly where high production manufacturing methods are being used. Thirdly, such a gauge should be capable of automatically indicating size limits over a given tolerance range so that an unskilled operator can easily determine in the event the work piece is over or under the precise size, whether or not it is within the assigned tolerance. A gauge having this characteristic should also be well adapted to use in connection with automatic inspection, sorting and recording devices, where it is desirable so to employ the gauge. Fourthly, the gauge must be characterized by a high degree of sensitivity in order to be able to detect size variations of the order of a few millionths of an inch or less, and indicate the same to the operator. Fifthly, unless such a gauge is highly stable, its indications are unreliable. Accordingly, the gauge should be characterized by such simplicity of structure as not to require unduly high precision in the machining of its component parts, and so as not to be affected by normal temperature variations such as are customarily encountered in a normal area of use. There are, of course, additional factors that should characterize such a gauge, such as ability to withstand hard usage, accuracy of response over extended periods of use, and low maintenance requirements.

The objects of this invention include the attainment of these and other characteristics.

According to my invention with respect to its broader aspects, I am able to determine the value of a condition or the value of a variation thereof by creating another condition whose value is a function of the value of the first condition or the variation thereof, and then generating a quantity, the value of which may be measured and indicated, which is linearly proportional to the value of the created condition.

More specifically, an electrical method of measuring minute values is provided which utilizes variations in the effective strength of a magnetic field in the region of an inductance coil which is energized by an electrical current having alternating components. The alternating components of this magnetic field induce an alternating voltage in a second coil, the amplitude of the induced voltage depending on the effective strength of the magnetic field at the location of the second coil. A change in relative position of the second coil and magnetic field causes the amplitude of the induced voltage to change by reason of the change in effective strength of the magnetic field at different relative positions. This change in amplitude of the induced voltage may then be used as a measure of the relative position of the coils, provided the law of magnetic field strength or induced voltage change with respect to the relative movement is accurately known. By suitably arranging the coils and relative movement thereof, a linear relation between coil position and induced voltage amplitude is attained so that simple and accurate calibration may be obtained for a wide range of distances.

Inasmuch as my method is based on fundamental electrical principles of magnetic field strength near an energized coil, it is accordingly not restricted to any particular frequency of operation, and the system may, as noted above, be non-ferrous. Thus high frequency alternating or periodically varying voltage sources, as well as low frequency sources, may be used to energize the coils. I prefer, however, to use frequencies of a relatively high order in order to obtain extremely rapid electrical response, for example, within one thousandth of a second or less, with the use of frequencies in or above the ordinary audio range. Furthermore by employing frequencies of this order, I am able to use small coils, thus increasing the stability, and reducing the inertia of a movable coil as well as the size and weight of distance measuring apparatus.

The invention will be further described by referring to the accompanying drawings in which Figure 1 shows the movement of a coil in the magnetic field generated by the passage of an alternating current through another coil;

Figure 2 shows one means of obtaining a linear relation between coil position and induced voltage amplitude;

Figures 3 and 3a show diagrammatically the relation between induced voltage and distance displacement for one type of space relation between coils, and path of relative movement of the coils;

Figures 4 and 4a show the relation between induced voltage amplitude and distance displacement having another arrangement of coils and path of relative movement thereof;

Figures 5 and 5a show the relation between voltage amplitude and distance displacement between another coil arrangement and path of relative movement thereof;

Figures 6 and 7 show the relation between voltage amplitude and distance displacement with another and preferred type of coil arrangement and path of relative movement of said coils;

Figure 8 shows diagrammatically engagement of a gauge spindle and workpiece;

Figures 9 and 10 illustrate diagrammatically the relation between rate of distance displacement, e. g. rate of spindle movement of a gauge and frequency of the electrical current or voltage change in the coils;

Figure 11 is a perspective elevational view of a gauge structure;

Figure 12 is a plan view of the apparatus shown in Figure 11;

Figure 13 illustrates diagrammatically the effect of phase balance in the region of zero output voltage correlating with amplification of the output voltage and measurement thereof;

Figure 14 shows diagrammatically, for purposes of illustration, an electrical circuit embodying certain specific applications of the principles of the invention;

Figure 15 shows diagrammatically the principle of automatically cutting off meter indications for spindle movements in a particular direction away from a predetermined spindle position corresponding to the balance point;

Figure 16 shows a particular means of prolonging a dimension indication to permit a visual or other record thereof under conditions where spindle displacement occurs at high speed; and, Figure 17 shows the response of the apparatus shown in Figure 16.

As shown in Figure 1, an alternating voltage $E_1$ may be applied to a coil $L_1$ with the result that a voltage $E_2$ is induced in a second coil $L_2$ located in the electromagnetic field of the first coil. The amplitude of the induced voltage may be indicated by a suitable meter M connected to the terminals of the second coil. The induced voltage $E_2$ has the same general characteristics as the applied voltage $E_1$, except that it may be either in phase with or opposed (substantially 180° out of phase) to the applied voltage. It is apparent, of course, that the amplitude of the induced voltage may vary over a wide range, depending on the amplitude of the applied voltage and the relative positions of the two coils.

When the applied voltage is maintained at a constant amplitude, the induced voltage is constant in amplitude for a fixed relative position of the coils, as represented, for example, by the coils $L_1$, $L_2$ of Figure 1. If the second coil $L_2$ is then moved to a new position, as represented by the dotted coil $L'_2$, the amplitude of the induced voltage changes to a new value $E'_2$ for almost any direction of motion of the coil. This change in amplitude of the induced voltage may be used as a measure of the distance through which the coil has been moved by a suitable calibration of the change in voltage in terms of coil position.

It is desirable to have a linear relation between coil position and induced voltage in order to provide accurate and stable calibrations over a wide range of distance measurement, as will be more fully described below.

One manner of obtaining a linear relation between coil position and induced voltage amplitude is shown in Figure 2, in which a fixed coil 20 is energized by the application of an alternating voltage $E_1$ to its terminals. A second coil 21 is arranged so that it may be rotated about an axis 22 by a lever 23 in a region in which the magnetic field of the energized coil 20 is approximately uniform. When the tip 24 of lever 23 rests on the top surface of a support 25, the axes of the two coils are arranged to be perpendicular so that the voltage $E_2$ induced in movable coil 21 is substantially zero. When the tip 24 of lever 23 is raised by an amount represented by the vertical distance D, coil 21 turns through an angle A and the induced voltage $E_2$ increases in amplitude by an amount proportional to the sine of the angle of rotation A. This may be expressed by $E_2=K \sin A$, where K is a suitable constant. It is apparent that the sine of angle A is equal to distance D divided by the radius R of lever 23, so that the above equation may be written $$E_2 = \frac{KD}{R}$$

With constant values of K and R, which may be obtained with a voltage of constant amplitude applied to the fixed coil, the induced voltage is proportional to the vertical distance through which lever tip 24 is moved, and thus varies in a substantially linear relation with the vertical dimension of an article placed between the top of support 25 and lever tip 24.

While the structure shown in Figure 2 has a number of advantages and is structurally simple, it should be understood that it is merely illustrative of the principles involved in my method of operation.

In other physical embodiments of my apparatus, there are advantages in the use of a linear relative motion of coils to convert distance displacement into electrical values, and I have found that certain coil arrangements provide a useful and highly accurate method of distance measurement, as will appear in the following.

The several curves shown in Figures 3, 4 and 5 are illustrative of the relation between voltage and distance displacement where linear coil motion is used. These curves show the relative amplitude of voltage induced in a coil when it is moved along a straight line in the electromagnetic field of a fixed coil energized with an alternating current of constant amplitude. The horizontal dimensions of these curves represent the location of the movable coil with respect to the fixed coil, measuring from a central position nearest the center of the fixed coil. Vertical dimensions represent the relative amplitude of the voltage induced in the moved coil. The small diagram 3a, 4a, 5a accompanying each curve indicates the relative coil positions, the dotted arrow showing the direction of motion of the movable coil.

Referring to Figure 3, I have shown the relation between distance displacement and induced voltage when the two coils are arranged with concentric or common axes, and the line of motion is along the common axis, one coil being smaller than the other so that it may be moved through the center of the larger.

Figure 4 illustrates the voltage distance relation of two coils having parallel axes, one coil being at the side of the other. In this case the voltage reaches zero at two points equidistant from the central coil position, and reverses in phase at greater distances from the center. The reversal in phase is indicated by the negative region of the voltage dimension i. e. voltages represented as negative or below the zero reference are opposite in phase to those represented as positive.

Figure 5 shows the voltage distance relation of two coils having perpendicular intersecting axes. The line of motion in this case is parallel to the axis of one coil, and it may be noted that the voltage is zero at zero distance, i. e. when the axis of one coil intersects the center of the other coil. The voltage reverses in phase at this point, and is equal in amplitude but opposite in phase symmetrically about this point of zero voltage.

It will now appear that the curves shown in Figures 3, 4 and 5 have an important characteristic in common, namely they are complex curves having regions of reversed curvature between which exist points of inflection. The approximate location of these points of inflection are indicated by the designation P. At each point of inflection, the curvature becomes zero, i. e. the curve is a straight line or is linear at the point of inflection, and substantially linear for a greater or lesser distance on each side of this point. At this point, the rate of change in voltage per unit distance is substantially constant, and it is only in the region of a point of inflection that a substantially linear relation exists between voltage and distance. Hence, by arranging the coils to operate at or in the region of a point of inflection of their voltage distance characteristic and by including in the circuits thereof a proper balancing voltage where needed, a substantially linear conversion of distance to an electrical value may be obtained.

From a consideration of Figures 3, 4 and 5, it will now appear that the distance over which the distance voltage relation is linear depends on several factors, including size, shape and primary location of the coils, and may be increased or decreased by suitable coil design. It will also be noted from a consideration of Figure 5, that the coil design and location corresponding to the central point of inflection provide a greater range of linearity than the coil arrangements shown in Figures 3 and 4, and furthermore provide a zero induced voltage at the point of inflection.

A variation in space relation may be measured with the coil arrangements illustrated in Figures 3, 4 and 5 by arranging the coils to be relatively movable in accordance with the variation along a suitable path and locating the coils relatively at or near a point of inflection. An energizing voltage having alternating components is applied to one coil, with the result that an alternating voltage is induced in the second coil. A balancing voltage having characteristics the same as those of the induced voltage, but opposite in phase, is obtained by conventional means from the energizing voltage. The balancing voltage is combined with the induced voltage with the result that the combined voltages, or output voltage, is then substantially zero owing to the phase opposition of the two combined voltages.

Variation in relative coil position from their initial position, in accordance with the variation to be measured, then causes the output voltage to increase in amplitude from substantially zero in a linear relation with the variation. A suitable indicator of the voltage amplitude, calibrated in terms of distance, then indicates the variation. Furthermore, the phase of the output voltage reverses with a reversal of the direction of relative motion of the coils from their initial position, so that the phase of the output voltage may be used to indicate the direction of relative movement of the coils.

The balancing voltage may be adjustable over a wide range and it then provides a means for adjusting the output voltage to substantially zero or to other desired values, for any relative coil position or for any particular value of induced voltage. It thus provides a means for operating at or near any desired inflection point and provides other characteristics, as will be shown hereinafter.

In a preferred embodiment of my invention, and to the end of attaining an extended range of linearity, together with other important characteristics of utility in accurate distance measurements, I have provide the coil arrangement shown in Figure 6. In this arrangement three coils are located on a common axis 26, two of the coils, 27 and 28, being identical and fixed in position, while the other coil 29 is disposed between coils 27 and 28 and is movable along axis 26. When an alternating voltage $E_1$ is applied to one fixed coil, e. g. coil 27, and movable coil 29 is moved along axis 26, the voltage induced in the movable coil varies in amplitude with change in distance in a manner similar to that illustrated by the curve in Figure 3. This variation in voltage with distance may be represented by the curve 30 in Figure 7, the location of the center of fixed coil 27 in this case being represented by the vertical line 31 on the distance coordinate.

Referring back to Figure 6, if the same voltage $E_1$ is disconnected from coil 27, and is then applied to the other fixed coil 28, the variation in induced voltage with distance displacement may be represented by the dotted curve 32 in Figure 7, the location of the center of this fixed coil 28 being represented by the vertical line 33. It will now appear that the connections of the fixed coil 28 may be reversed with a resulting reversal in the phase of the induced voltage in which case the induced voltage may be represented as a negative voltage by the curve 34.

If then the applied voltage is connected to both fixed coils in such a manner that their electromagnetic fields oppose one another, the field around one fixed coil, e. g. coil 27, induces the voltage illustrated by curve 30, while the field around the other coil 28 induces the voltage of opposite phase illustrated by curve 34, in movable coil 29. It follows that the resulting induced voltage is the algebraic sum of these two voltages, which is represented by the heavy curve 35. Thus, the actual induced voltage varies with the position of movable coil 29, as shown by curve 35, the induced voltage being accurately proportional to the distance through which the movable coil is moved from its central position for a comparatively large distance of movement. In other words, a very substantial range of linearity is provided. This range may be increased by selecting, for given coils, a space between the fixed coils in which the curvature of the voltage distance relationship of each fixed coil compensates or cancels out over a large distance resulting in a linear voltage distance relation of very substantial range.

In addition to attaining a substantial range of linearity with the coil arrangement shown in Figure 6, this arrangement has another advantage of substantial importance in dimensional measurement of high accuracy, in that such arrangement is sensitive to displacement of the moving coil in one direction only, namely along the common axis of the three coils. Other displacements of the movable coil, such as lateral motion relative to the common axis, or a tilting motion which might well normally result from manufacturing limitations, are compensated and produce a negligible change in induced voltage amplitude, even when measuring with an accuracy of a millionth of an inch or less. Lateral motion of the moving coil relative to the common axis, even over an appreciable distance, results in negligible voltage amplitude change, because of the fact that as one side of the moving coil approaches nearer to one side of the fixed coil, thus tending to increase the voltage induced, the opposite side of the moving coil moves farther from the fixed coil by the same amount, thus reducing the induced voltage. Thus the net change in induced voltage is substantially zero. Similarly, if the movable coil is tilted, as may well occur when it is mounted with free fitting bearings, one side of the movable coil moves parallel to its axis, while the opposite side of the movable coil moves parallel to the axis but in the opposite direction by substantially the same amount. Thus, the increased voltage induced in one side of the coil is cancelled by the reduction of voltage induced in the other side, again resulting in no net amplitude change. It follows then that the movable coil may be mounted in various ways so as to operate with a free motion, without introducing errors in measurement.

My coil system utilizes air-core coils and might be characterized as non-ferrous, thus attaining the desirable characteristics of high stability, simplicity and being essentially independent of frequency. Furthermore, no appreciable forces due to magnetic action or attraction exist in the movable portion of such a system so that the relative coil position may be freely changed without being influenced by the strength of the magnetic field.

The change in amplitude of the induced voltage resulting from relative movement of the coils is substantially instantaneous, that is, the amplitude changes with the coil position with no appreciable or measurable delay. This system thus may be considered to instantaneously modulate the amplitude of an alternating voltage in accordance with the position of a coil, regardless of the speed with which the coil position changes.

While the modulation is instantaneous, a finite time interval is ordinarily required by practical indicators to give an indication or a measure of the amplitude. This interval depends upon the frequency of the induced voltage, decreasing as the frequency increases, so that the maximum speed of response of the measuring system is generally limited by the action of an indicator to a value which depends on the frequency of the induced voltage.

As pointed out above, high speed of response or measurement is of primary importance in many industrial inspections where small distances such as the measurement of momentary strain and surface smoothness are involved, and in industrial gauging. For example, the diameter of large quantities of workpieces, such as pistons and bearing rollers, are usually gauged individually with high accuracy to insure proper fitting, such pieces being frequently sorted into several size groups within given tolerance limits having a variation of diameters of from one to a few ten-thousandths of an inch per group.

In such gauging, it is frequently desirable for reasons of accuracy of measurement and simplicity of motion, to pass workpieces through a gauge with a uniform motion, as illustrated in Figure 8, so that the workpiece moves continuously along an anvil or track while the maximum displacement of a gauge spindle or measuring member, bearing on the workpiece, corresponds to the correct diameter. While it is desirable for obvious reasons to maintain as high a rate of gauging as practicable, particularly in automatic gauging, it is found that the speed is usually limited to the speed of response of the gauge.

For example, as a workpiece passes through a gauge, the motion of the spindle or measuring member of the gauge may be illustrated by Figure 9, in which vertical ordinates represent the position of the spindle, greatly magnified, while horizontal ordinates represent time in seconds. A 60-cycle wave 40 is superimposed on this figure for timing purposes. When a workpiece, as illustrated in Figure 8, moves at a speed of, for example, one inch per second, the position of the spindle in the region of its maximum height may be represented by the curve 41 of Figure 9. For purposes of utility, the piece being measured should ordinarily remain under the spindle, so that the spindle remains within the limits 42 representing a reasonable accuracy of measurement, for a period of the order of one cycle of the energizing frequency, so that the amplitude of one cycle of the output voltage may give a reasonably accurate indication of the diameter of the piece. Usually the speed must be slower than that illustrated to allow time for several cycles of the output voltage to operate a suitable indicator.

When the speed of the workpiece is increased to a quite moderate speed of, for example, 20 inches per second, the motion of the spindle may be represented by curve 43. It may be noted that in this case the interval 44 during which the spindle is in the correct position to indicate diameter with reasonable accuracy is far too small a fraction of a cycle of the energizing frequency to produce any amplitude change in the output voltage capable of indicating size. The duration of the measuring interval 44 may be of the order of 0.001 second or less with ordinary speeds of travel of the workpiece, and ordinary electrical gauging methods utilizing power frequencies fail far below such speeds.

My invention provides a method of measuring small distances having no electrical limitation in speed of practical importance in any ordinary gauging. A single moving element of the utmost simplicity is employed for converting distance to electrical value. Thus the moving element of a gauge may be very light in weight so that it responds with high speed and accuracy to dimension changes. This method also eliminates the inherent restrictions of magnetizable cores so that any desired frequency up to and including radio frequencies may be employed for energization. This speed of action is illustrated in Figure 10, in which curve 43a represents the same spindle motion, drawn to the same scale as that of curve 43 of Figure 9. A suitable energizing frequency is represented in Figure 10 by the close vertical lines 45.

For a measuring interval 44a of 0.001 second, and an energizing frequency of 100,000 cycles per second, 100 complete cycles occur during the measuring interval, while with an energizing frequency of 1,000,000 cycles per second, 1000 cycles occur during the measuring interval, many more than are required to operate an indicator of size. Thus for a wide range of practical operating frequencies the speed of accurate measurement, i. e. the speed of response, is far greater than the speed of the spindle motion illustrated in Figures 9 and 10, and the electrical response is sufficiently rapid that it can follow the position of a gauging spindle within less than one thousandth of a second, so that a visible or other indication of size which may be held for as long a time as desired can be obtained. The electrical speed is high compared to the mechanical speed of the spindle motion so that the speed of the gauge is limited only by that of accurate motion of the spindle.

Owing to the simplicity and light weight of the moving element of the gauge, the maximum speed of accurate spindle motion may be made quite high; it being quite practical to gauge accurately in less than 0.001 second or with workpieces moving at speeds greater than several feet per second, speeds many times that of ordinary gauges. In continuous gauging of, for example, sheet or wire, the high speed of this method permits the detection of flaws or thickness variations of only a small fraction of an inch in length at a speed of travel of many feet per second.

While many forms of equipment may be made utilizing the above method of distance measurement, an example of one application to industrial measurement is a gauge of the external comparator type, suitable for general measurement or comparison of dimensions over a wide range of accuracy of, for example, a few millionths of an inch or less to several thousandths of an inch or more.

Such a gauge compares a dimension of a workpiece with that of a standard and provides two types of size indication by means of different indicators. One type, useful when exact sizes are required, is a meter indication which shows the difference in dimension between a workpiece and a standard, directly in suitable fractions of an inch. The second type, useful in rapid production inspection, is an automatic limit indicator, far more rapid than a meter, which may be preset, for example, to two dimension limits, then by means of three indicators such as colored lights, the size of a piece may be classified as either within the dimension limits, oversize or undersize. More than two limits may also be employed for purposes for sorting or classification into a number of size groups. Either type of indicator may be employed for indicating dimension differences of any value from a few millionths to several thousandths of an inch or more.

As noted hereinabove, I prefer to use the coil system shown in Figure 6 for certain types of gauging and have embodied this preferred arrangement in a gauge head generally indicated at 50 in Figure 11. Head 50 is carried by a bracket 51 which is vertically adjustable along a rack 52 through manipulation of a knob and gear generally indicated at 53 by which the gauge head can be set and locked in any desired position above a base 54 which supports an anvil 55 adapted to receive the workpiece. Head 50 includes a base plate 56 on which a casing 57 is mounted, this casing housing substantially all of the operating elements of the gauge head.

Disposed within the housing and secured thereto in any suitable manner is a support 58, to the top of which is fastened a coil supporting bracket 59 as by screws 60, this bracket being formed of non-ferrous, non-magnetic material such as, for example, brass. The free end 59a of bracket 59 extends beyond support 58 where it supports a stationary coil form 61 which is fastened in the outer end of the bracket in any suitable manner. Coil form 61 is fabricated from any suitable insulating material having stable characteristics suitable for a gauge of the type under consideration, and has wound thereon a pair of suitably spaced coils 62 and 63, these coils being electrically connected so that their magnetic fields oppose one another.

Reciprocably mounted within coils 62 and 63 in a manner to be described is a spindle 64 on which a sleeve 65 of non-magnetic material, such as copper, is fastened. Sleeve 65 in turn has secured thereto a coil form 66 also formed of a suitable insulating material, and on which is wound a coil 67, the opposite ends of which are attached to leads 68 and 69 (see Figure 12). Each of these leads as, for example, lead 69 (Figure 11) is carried in a groove 70 cut in the coil form 66, and extends slightly upwardly therefrom. The other lead 68 is similarly mounted in a slot formed in the opposite side of coil form 66, the two leads being secured in their bottom ends to the coil form in any suitable manner and firmly held in place thereon by a suitable number of turns of lacing cord 74. The upper ends of leads 68 and 69 are attached to the ends respectively of resilient connectors 75 and 76, the other ends of which are fastened to suitable terminals 77 and 78 mounted on opposite sides of the gauge head casing 57.

Terminals 77 and 78 also have connected thereto the wires 79 and 80 of a cable 81, which carries the output of movable coil 67 (Figure 11) as will be described in greater detail hereinbelow.

Collar 72 provides a support for the lower end of a spring 82, the upper end of which bears against the bottom of a pressure adjusting plate 83 fastened to the top of casing 57. An adjusting screw 84 is threaded through the top of the casing and against the top of pressure adjusting plate 83 so that the vertical position of the plate can be varied as desired, thereby to set the pressure of spring 82 to any desired value. This spring 82 is provided to impart a downward bias to spindle 64 to assure the close contact of its bottom surface with a workpiece when the workpiece is set therebeneath on anvil 55. The upper end of spindle 64 accordingly extends upwardly through spring 82 through a hole 83a in pressure adjusting plate 83 and through a suitable hole in the top of casing 57 which acts as a bearing for the upper end of the spindle. Preferably I provide a dust cap 85 to cover and accordingly protect the top of spindle 64.

The bottom of gauge casing 57 has a hole 86 formed therein which receives the upper end 87a of a bushing support 87 having formed thereon a flange 88 by which the bushing support is secured to the bottom of casing 57 in any suitable manner as, for example, by screws (not shown). The lower end of bushing support 87 carries a bushing 89 which is held within the support by means of a set screw 90. Thus, bushing 89 forms a lower bearing for spindle 64, and accordingly coacts with the hole in the top of casing 57 to restrict the motion of the spindle substantially to a vertical path, sufficient play, however, being provided at the spindle bearings to permit substantially frictionless movement of the spindle. The lower end 64a of spindle 64 has fastened thereto a coupling 91, the lower end of which receives a hardened end 92, the bottom of which engages the top of a workpiece placed on anvil 55 beneath the spindle.

Spindle 64 also has mounted thereon a collar 93 provided with a vertical slot 94. A guide screw 95 threadably extends through the upper end 87a of bushing support 87 to a position where its inner reduced end 95a enters slot 94 thus restricting angular movement of the spindle to preclude damage to the connections of leads 68 and 69 with connectors 75 and 76 respectively.

It may now be seen that when the workpiece is placed in the gauge beneath the gauge head, spindle 64 is moved upwardly, thus imparting movement to coil 67 relative to stationary coils 62 and 63, which results in a voltage being induced in the movable coil. The coils are so arranged that the movable coil moves along a path in the magnetic field of the stationary coils in which the field strength is a linear function of movement along the path. Hence the voltage induced in the movable coil is linearly proportional to the amount of displacement or movement of the movable coil as described hereinbefore in connection with the coil shown in Figure 6.

As noted in connection with Figures 6 and 7, a distance may be measured by moving the small coil 29 along its axis for a given distance, and measuring the change in amplitude of the voltage developed in the movable coil by means of a suitable meter, making proper allowance for any reversal in phase. Over any distance within the limits of linearity of curve 35 (Figure 7), the change in voltage amplitude is accurately proportional to the change in space relation, and thus is an accurate measure of the distance through which the coil moves.

When measuring quite small distances or measuring with high accuracy, it is preferable to operate with the movable coil 29 in a region near its central position relative to the fixed coils 26 and 27.

In this coil arrangement, voltage is induced in the movable coil by means of opposing magnetic fields, the strength of one increasing and the other decreasing, as coil 29 is moved to various positions along the coil axes. It may be considered that two opposing voltages are induced in the movable coil, which at the central position substantially cancel or balance out resulting in substantially zero voltage when the two voltages are equal in amplitude and opposite in phase. The degree of balance depends on the exactness of phase opposition or phase balance, as well as equality in amplitudes of the induced voltages.

This is illustrated in Figure 13 which represents the amplitude of the voltage developed in the movable coil, disregarding phase, as the coil is moved in the region of its central position. As illustrated by curve 96, the amplitude reaches a minimum value at the central position 125, for a given phase balance, while for a better phase balance it reaches a lower value as illustrated by curve 97. The values approach a perfect balance indicated by the broken lines 98 as the phase balance increases in exactness.

In measuring very small variations in space relation of for example a few millionths of an inch, it is desirable to employ vacuum tube amplifiers to magnify the small voltage changes corresponding to such variations. The output of such amplifiers is limited and overload occurs above certain values so it is desirable to operate within definite limits of voltage applied to the input of an amplifier.

For example, in Figure 13, a range of voltage may be represented by the interval 99, which is suitable for measuring variations in space relation along a range 100, when using an amplifier having an upper limit represented by the voltage amplitude 301. It is apparent that the phase balance illustrated by the curve 97 provides satisfactory operation while that corresponding to the curve 96 fails to operate owing to the high minimum voltage amplitude. In other words, the phase balance illustrated by curve 97 provides region 99 wherein the response is linearly proportional to movement along the range 100, whereas the phase balance illustrated by curve 96 has no region comparable in extent to region 99, hence movement through the lefthand portion of range 100 would not evoke a linearly proportional response.

The maximum amplification that can be employed increases as the accuracy of the balance increases so that for measurements of extreme sensitivity it is advantageous that an accurate balance be provided to meet the requirements of a suitable amplifier.

When the coil system shown in Figure 11 is employed, a simple and stable phase adjustment is provided by bracket 59 and an adjustable non-magnetic metallic plate generally indicated at 101. Bracket 59 which supports the fixed coils 62 and 63 is located a suitable distance above upper fixed coil 62, plate 101 being located at approximately the same distance below the lower fixed coil 63.

Plate 101 is annular in shape to permit the passage therethrough of spindle 64 and is provided with an ear 102 fastened to the bottom of casing 57 by screws 103. Thus plate 101 is resiliently mounted within the casing below the coil system. Vertical adjustment of plate 101 is effected by an upwardly extending screw 104 threaded through the bottom of casing 57. Thus by manipulation of screw 104 the position of plate 101 may be adjusted relative to the coil system.

Owing to the circulating currents set up in plates 101 and bracket 59 by the magnetic fields of coils 63 and 62, the effective resistance of each fixed coil is slightly increased and thus the phase of each magnetic field is slightly changed by the proximity of each plate to the adjacent coil.

By raising or lowering the adjustable balance plate 101, the phase of the magnetic field of the lower fixed coil 63, and thus the phase of the corresponding voltage induced in the movable coil, may be adjusted over a sufficient range to accurately balance the phase of the induced voltages. A highly accurate balance may thus be obtained. This balance is highly stable since the entire balancing system is contained in a single structure which is simple, symmetrical and mechanically stable, and the balance is independent of external connections, circuits or apparatus.

In maintaining an accurate phase balance, it is desirable that movement of spindle 64 which carries the movable coil 67 have a negligible effect on the phase of the magnetic fields. To prevent variations in phase, the spindle is made of substantially uniform diameter along the portion within the magnetic fields of coils 62 and 63 so that its effect on the phase of the fields is uniform and constant regardless of its position. Also as movable coil 67 is mounted over the non-magnetic shield 65, variations in the magnetic characteristics of the spindle material have a negligible effect on the phase balance of such a gauge.

Conveniently the gauge is made in two parts, the gauge unit or head 50, as previously described, and an electrical unit generally indicated at 105 (Figure 14). The gauge head 50 may be placed in any convenient location, the coils 62, 63 and 67 of the gauge head being connected by means of cables 142, 143 of suitable length to the terminals 144, 145 of electrical unit 105. This connection may be made through separable connectors to permit easy disconnection of the gauge unit if desired. The cables may be of conventional electrical shielded type to prevent electrical interference.

The electrical unit 105 is preferably a single compact unit containing all circuits, controls and apparatus associated with operation of the gauge. If desirable, however, the size indicators (described below) may be a part of this unit or may be located separately at a desirable position and connected to the electrical unit through suitable conductors.

Power for operating the gauge may be supplied from ordinary A. C. power lines by means of a suitable connector 150, and is connected through an on-off switch 151 to the terminals 152 of a conventional power unit 153. This unit 153 thus contains apparatus such as transformers, rectifiers and filters of a conventional type for supplying suitable A. C. and D. C. power to the gauge circuits. Voltage regulators of the usual types may also be incorporated in this unit for stabilizing the D. C. or A. C. voltages supplied to the gauge. Accordingly, power unit 153 supplies a regulated D. C. voltage of substantially constant value at the terminals 154 from which it is distributed to various circuits, as shown. The negative terminal of this voltage is connected to a common ground 155 in a conventional manner for convenience in circuit connections. A. C. voltages (not shown) are also supplied by unit 153 to the heaters or filaments of vacuum tubes employed in the gauge in the usual manner. Other voltages which are also supplied by the power unit will be described later.

An oscillator 159 of a convention vacuum tube type receives D. C. power at the terminals 160 and supplies an alternating voltage to terminals 161 for energizing the gauge head 50. Owing to the regulation of the D. C. voltage supplied to the oscillator, such an oscillator may readily provide an alternating voltage of substantially constant amplitude, regardless of ordinary power line voltage variations. The frequency of the oscillator is fixed at a value suitable for the purposes of the gauge and may be of the order of 100 kilocycles per second.

The oscillator 159 (Figure 14) thus supplies an alternating energizing voltage of substantially constant amplitude, having a frequency of approximately 100 kilocycles, to the terminals 161. A second voltage of the same frequency and having a constant phase relation with the energizing voltage at terminals 161, is also supplied from the same oscillator to terminals 162.

The energizing voltage at terminals 161 is connected directly to terminals 144 of the electrical unit 105, and is applied through the cable 142 to the series connected fixed coils 62 and 63 of the gauge head. In the manner previously described, a measuring voltage is developed in movable coil 67 which is connected through a cable 143 to the input terminals 145 of the electrical unit 105. The gauge head thus supplies to the input terminals 145 a voltage of the same frequency as the energizing frequency of coils 62 and 63 having an amplitude and phase which depends upon the position of the movable coil.

A gauge of this type is usually set to a standard dimension by placing a standard piece such as a stack of gauge blocks under the gauge head, then adjusting the gauge head until an indicator, such as a meter, shows an exact value. Variations in the size of workpieces from the standard dimensions are then indicated directly when the workpieces are placed in the gauge. In many cases this initial standard dimension adjustment must be made with high accuracy, sometimes within a few millionths of an inch. In known gauges of this general type, at least one, and in some cases several, mechanical adjustments have been provided in addition to a first rough setting of the gauge head position, to permit setting with adequate accuracy. Such arrangements add mechanical complexity and instability and complicate the adjustment of a gauge.

In my gauge, a single electrical adjustment accomplishes quite simply and with high accuracy the entire adjustment of the gauge to a standard dimension after the first rough setting of the gauge head position. It also has other useful functions in setting test limits, as will be apparent in the following.

This electrical adjustment is effected by combining a balancing voltage with the measuring voltage at the input terminals 145 of the electrical unit. The balancing voltage is of the same frequency as the measuring voltage and is arranged so that it may be adjusted in amplitude over a wide range either in phase with, or opposite in phase to that of the measuring voltage. The balancing voltage may therefore be adjusted to add or subtract any desired amount from the measuring voltage.

The balancing voltage may be supplied in a number of ways, but the use of a conventional variocoupler arrangement, generally indicated at 106 in Figure 14, is simple and effective, and illustrates the operation of this adjustment.

The primary winding 163 of variocoupler 106 is connected directly to the energizing voltage at terminals 144, and a rotatable secondary winding 164 of the variocoupler provides a secondary voltage which may be varied from substantially zero to a suitable amplitude value, having either approximately the same or opposite phase as the energizing voltage, by rotation of the secondary winding. Since both the gauge head 50 and variocoupler 106 are energized from a common voltage source, the variocoupler secondary voltage is approximately in phase or opposed in phase with that of the measuring voltage.

The secondary winding 164 or variocoupler 106 is connected to the input terminals 145 of unit 105 through an adjustable resistor 165 which may be adjusted to correct any small remaining phase difference so that the phase of the variocoupler secondary voltage is substantially equal or opposite to that of the measuring voltage at terminals 145. The variocoupler thus supplies a suitable adjustable voltage of exact phase relationship at the input terminals 145, which is reversible in phase and adjustable in amplitude.

It may now be seen that by adjustment of the variocoupler, a constant voltage of any suitable amplitude is added to or subtracted from the measuring voltage from gauge head 50, thus providing the same electrical effect as though the gauge spindle 64 were raised or lowered. For example, after roughly setting the gauge head to a standard piece, the measuring voltage may be quite large, owing to inexact setting of the head. The balancing voltage is then adjusted to subtract a suitable fixed value from the measuring voltage by adjusting with opposed phase until the combined voltage at terminals 145 is of a suitable amplitude to provide the exact indication, for example, a zero reading, desired. The gauge is then ready for measurement.

This electrical adjustment has the effect, electrically, of raising or lowering the gauge spindle, and so may be calibrated in suitable units of distance such as thousandths of an inch equivalent motion of gauge spindle, if desired. Thus a scale calibrated in connection with the variocoupler rotation, or other balancing voltage adjusting means, in terms of spindle movement, is quite accurate and stable since it is independent of the value of the energizing voltage at terminals 144 and is independent of ordinary frequency variations.

With simple mechanical driving arrangements, such a variocoupler provides accurate correction or adjustment for the position of the gauge head over a wide range. For example, a simple structure may furnish an equivalent gauge head adjustment within one millionth of an inch over a range of, for example, twenty thousandths of an inch, so that for a single position of the gauge head, an adjustment equivalent to moving the gauge head 0.020 inch with an accuracy within one millionth of an inch, is provided.

The voltage at the input terminals 145 resulting from the combined measuring and balancing voltages, is applied preferably through a coupling condenser 166 to an attenuator 167 of a conventional type. This attenuator is of a resistance voltage divider type having a series of resistors 167a across which the voltage is applied, and a switch 168 which selects the desired portion of the entire voltage for amplification. While such attenuators are simple and accurate, other forms may be employed, and in place of the coupling condenser 166, other coupling means such as transformers, resonant circuits, etc., may be employed for purposes such as increasing the amplitude or controlling the phase of the voltage applied to the attenuator.

With the attenuator switch 168 set in the position illustrated in Figure 14, the full voltage applied to the attenuator is applied directly to an amplifier 170 and a maximum sensitivity is provided. For example, under these conditions a voltage change of 0.01 volt at the amplifier input may correspond to a change in spindle position of 0.0001 inch.

When the attenuator is set to reduce the voltage applied to the amplifier by, for example, a factor of 100, then the gauge head must supply 100 times its original voltage change of 0.01 volt, or 1.00 volt to the attenuator to provide the same voltage change at the amplifier input. The spindle motion required to produce this voltage change is then 100 times its original motion of 0.0001 inch, or 0.010 inch, provided the conversion of distance to voltage of the gauge head is linear over the range of measurement, so that the attenuator acts as a highly accurate multiplier of the distance through which the spindle moves to apply an exact change in voltage to the amplifier.

As previously pointed out, this method of conversion is highly linear over a wide range of distance so that any desired number of ranges of measurement, from fine to coarse, may be readily obtained by providing the attenuator with a suitable resistance value for each range.

Owing to the linearity of conversion, the gauge may be calibrated over a comparatively large spindle motion of, for example, 0.010 inch with high accuracy since the calibration error is quite small for such distances. Then if the attenuation is decreased by a given factor, the same calibration divided by this factor is an accurate indication of the gauge spindle motion over a small distance without further calibration. The calibration of a single range of measurement under conditions permitting high accuracy may thus be transferred to any desired number of additional ranges with high accuracy by means of suitable attenuator values.

Accurate measurements of very small distances of less than a millionth of an inch, which are difficult to calibrate directly, may thus be made with a highly sensitive gauge, by calibrating the gauge over a longer distance capable of accurate measurement, with reduced sensitivity, and multiplying the sensitivity by an accurately known value by means of an attenuator. Also, a wide range of measurement may be provided; for example, a single gauge may be capable of measuring a distance as small as one ten-millionth of an inch or as large as a tenth of an inch or more, or any intermediate value, a range of measurement of a million to one or more.

Amplifier 170 delivers to its output terminals 172 an amplified voltage having characteristics similar to those of the input voltage. The amplifier may be of a conventional vacuum tube type having a substantially constant gain, the stability of which is aided by operation from the regulated D. C. voltage supplied to terminals 171 from the power unit.

With an energizing frequency of approximately 100 kilocycles, the amplified voltage thus has the same frequency, and is accurately constant in amplitude for a given input voltage but varies in amplitude with the input voltage. The phase relationship between the amplified voltage and the input voltage is approximately constant and may be adjusted if desired by means of conventional phase adjusting arrangements (not shown) incorporated in the amplifier.

The amplified voltage at the amplifier output terminals 172 is applied to a rectifier tube 173 and develops a rectified voltage at the terminals 195, 178 of the rectifier output circuit. This circuit includes a shunt filter condenser 177 which reduces the A. C. components of the rectified voltage to a negligible value, and an indicating meter 175 which is connected through a series resistor 176 across the rectifier output circuit so that the meter indicates the value of rectified or D. C. output voltage across terminals 195 and 178.

The rectifier tube 173 is a vacuum tube of triode type having a plate, or anode 196, a grid 197, and a cathode 198, and operates as a grid controlled rectifier. Its action may be compared to that of a conventional half wave diode rectifier when the potential of the grid is maintained at a potential approximately zero or positive with respect to the cathode. In that case the tube 173 conducts between plate and cathode when the plate is positive with respect to the cathode, so that the amplified A. C. voltage from amplifier 170, applied between the plate 196 and ground 155, causes a rectified current to flow between the cathode 198 and ground through the output circuit, developing a rectified or D. C. output voltage across terminals 178 and 195. This action is similar to that of a diode rectifier were it used in place of the triode 173, and provides a D. C. output voltage which increases or decreases with the amplitude of the amplified A. C. voltage, regardless of its phase.

When, however, the grid of the triode is placed at a sufficiently negative potential with respect to the cathode, current flow between the plate and cathode is cut off and the rectifying action is stopped so that the A. C. voltage from the amplifier develops no voltage in the rectifier output circuit. The potential of the grid thus controls the rectifying action of the tube.

In the operation of the gauge, an A. C. control voltage from oscillator terminals 162 is applied between the grid and cathode of rectifier tube 173 through a grid leak and condenser 174 which supplies a bias voltage and limits the current flow between the grid and cathode. This control voltage is arranged to be approximately in phase or opposed in phase to that of the amplified voltage supplied by the amplifier, by means of a conventional phase adjustment in the amplifier, if necessary.

With such a control voltage, the rectifier becomes selective in regard to the phase of the amplified voltage, its action being as follows. When the amplified voltage is in phase with the control voltage, both the plate and grid swing positive with respect to the cathode during one half of a cycle, and the rectifier tube conducts between plate and cathode so that current flows in the rectifier output circuit. During the other half cycle both grid and plate are negative and no conduction occurs. Normal rectifying action thus occurs, developing a D. C. output voltage across the output terminals 195 and 178.

When the amplified voltage reverses in phase, however, the grid and plate voltages swing in opposite directions so that the grid is negative during the half cycle that the plate is positive and prevents conduction in the tube. During the other half cycle, although the grid is positive, no conduction occurs between plate and cathode since the plate is negative. Thus no plate to cathode conduction occurs at any time, no rectification occurs, and no voltage is developed in the rectifier output circuit during the reversal of phase of the amplified voltage.

With the A. C. control voltage, the rectifier is selective to the phase of the amplified voltage applied to the rectifier, developing a D. C. output voltage when the amplifier voltage is of one phase, but automatically cutting off the rectification and developing no output voltage when the phase of the amplified voltage reverses. The general action is that of a grid controlled rectifier which in this arrangement responds automatically to a reversal in phase of an applied voltage, providing normal rectification for a voltage of one phase, but being inoperative for a voltage of opposite phase.

The advantage of this selective rectification may be shown in connection with Figure 15 which illustrates the variation in the amplified voltage and the D. C. output voltage with different rectifiers, as the gauge spindle is moved over various distances.

As previously pointed out in the description of phase relationships (illustrated in Figure 13), it is desirable to operate the gauge in the region of the minimum value, or balance point, of the voltages at the input to the amplifier, particularly when employing high amplification to measure very small distances. In this region the amplified voltage, represented by the curve 210 of Figure 15, has a minimum or zero value at the balance point 211, and increases in amplitude as the spindle moves in either direction from this point, the phase of the amplified voltage reversing at the balance point.

The use of ordinary rectifiers, or the triode rectifier 173 of Figure 14 with its grid maintained zero or positive with respect to the cathode, provides a D. C. output voltage, represented by the broken line curve 212 which corresponds in value to the A. C. voltage amplitude regardless of phase, and thus increases with movement of the spindle in either direction from the balance point.

The use of the selective rectifier having a synchronized control voltage of proper polarity or phase, however, provides a D. C. output voltage as shown by curve 214, a voltage being developed only when the A. C. voltage is of the proper phase. The D. C. voltage is substantially zero for any position of the gauge spindle below the balance point 211 and increases with distance for positions above this point, owing to the reversal in phase of the amplified voltage at the balance point.

A small distance to be measured may be represented by the interval 213, and over this distance a D. C. output voltage suitable for measurement is provided by either type of rectifier. The meter 175 (Figure 14) may be accurately calibrated in terms of spindle movement and a direct indication of distance is then provided.

When, however, the gauge spindle is at a point 215 (Figure 15) in the region below the balancing point 211, a second meter indication corresponding to the curve 212 is given when ordinary rectifiers are employed. This indication is both ambiguous and confusing, and serves no useful purpose in measuring the distance 213; furthermore, it is reversed in sense, increasing with decreasing distance, to that of the region above the balance point.

This spurious response may be eliminated with a mechanical stop which limits the spindle motion, but it is apparent that when the distance 213 is small, for example, 0.0001 inch or less, such a stop must be set with precision, and a slight misadjustment, wear or even dirt particles may prevent proper spindle motion. Moreover, the range of adjustment provided by electrical balancing means must be greatly restricted since it may also have the equivalent effect of moving the spindle into the region below the balance point 211.

Thus the selective rectifier employed in my gauge provides substantially zero D. C. output voltage in the region below the balance point and thus completely eliminates spurious distance indications regardless of the position of the gauge spindle. It also permits the use of a simple wide range electrical adjustment, equivalent to mechanically adjusting the gauge head, without ambiguous response, and thus eliminates the need for complex mechanical adjustment and provides other advantages in setting dimension limits, as will be apparent in the following.

It may now be seen that the general action of my gauge is to develop a D. C. output voltage which is a function of the dimension of a workpiece placed in the gauge unit. This voltage is indicated by a meter which is calibrated in terms of movement of the gauge spindle, and which may have several ranges corresponding to the positions of the attenuator switch.

As amplifier 170 (Figure 14) readily provides a wide range of D. C. output voltage which may vary from substantially zero to more than 100 volts, voltages of this order may be employed to operate indicating or other devices at pre-set values with high accuracy and thus provide automatic indication or control of auxiliary equipment when a dimension exceeds a certain value or is within certain limits.

For example, a D. C. voltage change of 100 volts may correspond in an approximately linear manner to a range of motion of the gauge spindle of 0.000,100 inch for a given setting of the attenuator. Then a change in the D. C. voltage of one per cent, or 1 volt, corresponds approximately to one per cent of the motion of the gauge spindle, or 0.000,001 inch, so that 1 volt represents about one millionth of an inch movement of the spindle. By arranging to operate a device such as a relay within a voltage change of 1 volt, a signal or other device may be made to operate within a dimension change of one millionth of an inch. With other attenuator settings other ranges of distance measurement are provided and such a device then operates with an accuracy of 1 per cent, more or less, of each distance range, thus providing an approximately uniform percentage accuracy for any distance range.

One such arrangement of high utility in general gauging, includes two adjustable dimension limits at each of which signal lights are operated. This arrangement, as shown in Figure 14, includes two limit tubes 179, 180 of a triode vacuum tube type, the grids of which are connected through current limiting resistors 181, 182 to the positive output terminal 195 of the rectified output voltage. The cathodes of the tubes are connected to adjustable arms 185, 186 of variable resistors 183, 184 of a voltage divider type, and through these resistors to ground 155, and thus to the other side of the rectified output voltage.

The variable resistors 183 and 184 are supplied with a substantially constant D. C. voltage from terminals 154 of power unit 153 through a limiting resistor 187, and the variable resistors thus supply bias voltages, adjustable by means of the adjustable arms 185, 186, to the limit tubes 179 and 180, between cathode and ground. The D. C. rectified output voltage is thus applied in series with separately adjustable bias voltages, between the grids and cathodes of the limit tubes.

The adjustable bias voltages then act as adjustable dimension limit controls. For example, if the bias of the lower limit tube 179 is set at 30 volts, as long as the D. C. output voltage is well below 30 volts, plate to cathode conduction in this tube is cut off owing to the negative potential of the grid with respect to cathode. When the D. C. output voltage increases to, or exceeds, a value near 30 volts, the grid approaches zero potential or becomes positive with respect to cathode, and allows plate current to flow from a suitable source.

The plate circuit of tube 179 includes the magnetizing coil 188 of a relay in series with a voltage source supplied at the terminals 156 of the power unit 153; likewise the plate circuit of the upper limit tube 180 includes a similar relay coil 189 and series voltage 157. The voltage sources 156, 157 may be either A. C. or D. C.; when A. C., the limit tubes act as grid controlled rectifiers, as described in connection with the rectifier tube 173, passing rectified current through the relay coils; when the voltage sources are D. C. of proper polarity, D. C. current is passed through the relay coils; so long as, in either case, the grid-cathode potential permits conduction.

When the rectified output voltage across terminal 195 and ground is thus well below the 30 volts just mentioned, the tube 179 is non-conductive, the relay coil 188 is not energized, and the relay armature 190 makes contact with the lower contact 199. A lamp voltage source 158 supplied by the power unit and connected through this armature circuit is thus applied to a lower signal lamp 192. When the D. C. output voltage approaches near or exceeds 30 volts, the relay coil is energized and lifts the armature 190 so that it makes contact with the upper contact 200, and connects the lamp voltage through the upper relay armature 191 to a central lamp 193.

In a similar manner the bias voltage of the upper limit tube 180 may be set, for example, at 50 volts, then this tube is non-conductive until the D. C. output voltage increases to a value near or exceeding 50 volts, at which value this tube becomes conductive, energizes the upper relay coil 189 and lifts the armature 191, thus removing the lamp voltage from the central lamp and connecting it to an upper signal lamp 194.

The lower signal lamp 192 thus remains lighted when workpieces having any dimension below that required to actuate the lower limit tube 179 are placed in the gauge; workpieces with dimensions above this value and below that required to actuate the upper limit tube 180, light the central signal lamp 193; while those with dimensions above the upper limit light the upper signal lamp 194. Suitable colors may be employed in connection with the signal lamps for identifying purposes.

The dimension limits at which the relays are actuated may be adjusted over a suitable range by adjustment of the bias voltage controls 185, 186, a range of bias voltage being provided which is adequate for the range of D. C. output voltage utilized for measurement.

In setting up this gauge to gauge a group of workpieces having, for example, a specified dimension of 0.500 inch with a tolerance of plus or minus 0.0005 inch, a standard piece such as a 0.500 inch gauge block is first placed in the gauge. A suitable range of measurement equal to or greater than the tolerance, such as a full range meter indication of 0.002 inch is selected with attenuator 167, and the gauge head is set roughly so that the meter 175 reads at some point on its scale. The meter is then adjusted to an exact standard reading near the center of its scale by means of variocoupler 106.

The meter reading is then decreased by 0.0005 inch from the standard reading by means of the variocoupler, and the lower limit control 185 is adjusted until the lower signal lamp is just extinguished, and the central lamp lights. The meter reading is then increased to a value 0.0005 inch above the standard reading and the upper limit is adjusted until the central lamp is just extinguished and the upper lamp lights. The meter is then returned to its standard reading and the gauge is ready for operation. Workpieces within tolerance will then light the central lamp, pieces above tolerance will light the upper lamp, and pieces below tolerance allow the lower lamp to remain lighted.

The variocoupler 106, in addition to simplifying the gauge head setting, thus also permits rapid and simple limit adjustment, requiring only a single standard piece for setting any desired limits near the standard within the particular range of the gauge being employed.

While the use of only three signal lamps in connection with two adjustable dimension limits is illustrated in Figure 14, it is apparent that many other combinations of limits and signals may be employed. For example, additional limits of a similar type may be readily utilized in a similar manner as the limits described, for sorting or classifying workpieces into a number of size groups. Other devices may be employed in place of or in addition to the signal lamps, such as solenoids, motors, high power relays, etc. for purposes of controlling signals, machinery, sorting equipment, etc. in accordance with dimensions. Recording equipment may be employed in connection with either the meter or the relays for recording dimensions continuously or intermittently.

The speed of response of the gauge illustrated in Figure 14, when employing the limit indicators, may be of the order of several thousandths of a second, it being limited in general by the time required for a relay to close and for a signal lamp to respond. High speed relays and lamps or other devices of course may be employed when a maximum speed of response is desired. Such speeds are far greater than can ordinarily be obtained with gauges depending on a meter for indicating dimensions, and the limit indicator described is highly useful in many gauging problems, particularly when a quantity of pieces are to be gauged.

In certain gauging operations it is sometimes necessary to effect a response, or indication, of a type different from that hereinbefore described. For example, in high speed gauging of the type illustrated in Figures 8 to 10 the measuring interval during which the gauge spindle is in a correct position for measurement, may be of a very short duration. Limit circuits of the type shown in Figure 14 while useful for many purposes, give a momentary impulse or indication of short duration in such gauging, and it is sometimes difficult to employ such indications either visually or for controlling ordinary equipment without the use of auxiliary equipment to prolong the indication or control impulse.

In high speed gauging, particularly when the measuring interval may be of the order of 0.001 second or even smaller, it is desirable to employ limit arrangements or circuits of the type illustrated in Figure 16, in place of or in addition to that illustrated in Figure 14. The arrangement shown schematically in Figure 16 may be actuated by a momentary voltage pulse of considerably less than 0.001 second duration, and it gives an indication or a control action for a period which may be of any suitable duration lasting from a fraction of a second to a second or more. Thus there may be provided an accurate dimension indication, prolonged for a suitable period, for a wide range of gauging speeds.

Figure 16 shows an arrangement or circuit for operation at a single dimension limit. While this will suffice to show the action of the circuit, it is apparent that any number of additional limits may be provided by the addition of a similar circuit for each limit. Thus the circuit includes two tubes 210 and 211 of a conventional hot cathode, gas filled, screen grid type, commonly known as thyratron tubes. In such tubes the conduction of a comparatively heavy anode current may be initiated by a small change in grid potential of either long or short duration.

The input terminals 195, 178 of this circuit are connected to the corresponding terminals of Figure 14, across which the rectified or D. C. output voltage is developed. D. C. power is supplied at terminals 154 (Figure 16) and a suitable lamp voltage at terminals 158, from, for example, the corresponding terminals of the power unit 153 of Figure 14.

The general circuit arrangement of the first tube 210 (Figure 16) is similar to that of the limit tubes 179 and 180 of Figure 14, the D. C. output voltage across terminals 178 and 195 (Figure 16) being applied between the control grid 212 and cathode 213, through a current limiting resistor 216 and a variable cathode bias resistor 217. The bias resistor 217 is connected through a limiting resistor 218 to the D. C. supply voltage 154 and thus furnishes an adjustable bias voltage to the tube 210. The anode circuit of this tube includes the anode 215, a current limiting resistor 219 and a relay coil 188 in series with the D. C. supply voltage 154. The screen grid 214 is connected to the cathode through a leak resistor 225.

This tube is normally non-conducting when the rectified output voltage across terminals 178 and 195 is well below the bias voltage, but when the rectified output voltage exceeds a value near that of the bias voltage, even for a very short interval, conduction between anode and cathode is established by the action of the tube. This conduction causes an anode current to flow through the relay coil and acuate the relay, lifting its armature 190 from the contact 199 to the contact 200, thus extinguishing the lamp 192 and lighting the lamp 193 in a similar manner to that of the circuit of Figure 14.

With no further action tube 210 (Figure 16) would continue to conduct indefinitely but the action of the second tube 211 is such that after a suitable interval, conduction in tube 210 is stopped. The anode of the second tube 211 is connected through a coupling condenser 223 to the anode of the first tube, and is supplied with a positive voltage, through a current limiting resistor 220, from the D. C. supply voltage 154. A small fixed bias is furnished between the cathode 211a and ground 155 by a resistor 221 and shunt bypass condenser 250, by connection to the D. C. supply voltage through a resistor 222. This bias voltage is such that the second tube 211 conducts at normal anode voltages.

The action of the circuit may be illustrated by the curves of Figure 17 which represent the anode voltages of tubes 210, 211 with respect to ground during operation of the circuit. The heavy curve 230 represents the anode voltage of the first tube 210 while curve 231 represents that of the second tube 211 during a cycle of operation.

At the beginning or left of Figure 17, the first tube 210 is in its normal non-conducting condition so that its anode voltage 230 is high, while the anode voltage 231 of the second tube 211 is low owing to its normal conducting condition. At the instant 235, conduction is initiated in the first tube 210 by the rectified output voltage momentarily swinging to a sufficiently positive value. At this instant, current flows in the anode circuit of the first tube 210 and drops its anode voltage 230 to a lower value as shown, and through the action of the coupling condenser 223, the anode voltage 231 of the second tube 211 is momentarily dropped an equal amount, to a negative value, and thus stops conduction in the second tube.

The anode voltage 231 of the second tube then rises slowly by the charging action of current flowing from the D. C. supply voltage through the resistor 220 (Figure 16) into the coupling condenser 223, the rate of this voltage rise depending on the values of the condenser 223 and resistor 220.

At a later instant 236 (Figure 17) the anode voltage 231 of the second tube reaches a value which initiates conduction in this tube, and this voltage then drops to a low value as shown, returning this tube to its original normal condition. At this same instant 236, the action of the coupling condenser 223 drops the anode voltage 230 of the first tube 210 momentarily by the same amount, thus making its anode negative momentarily as shown by the region 232 so that conduction of the first tube is cut off. Its anode voltage 230 then rises rapidly to its initial high value, returning this tube to its original normal condition. The tubes remain in this normal condition until the rectified output voltage again rises to a value sufficient to discharge the first tube.

Should the rectified output voltage remain at a high value after discharging the first tube, then the cycle just described occurs but following this cycle additional similar cycles, as illustrated by the broken curves 233, 234, continue automatically until the rectified output voltage is reduced below the discharge value.

In order to stabilize the action when the operating cycles are repeated automatically, a momentary voltage is applied to the screen grid 214 (Figure 16) of the first tube 210 from the anode of the second tube by means of the coupling condenser 224. This condenser applies a momentary negative voltage to the screen grid of the first tube at and slightly after the instant 236 (Figure 17) when the second tube 211 becomes conductive, and this negative voltage prevents the first tube from conducting again until its anode voltage rises to a high value 238 at the instant 237. When this conduction occurs, the drop in anode voltage 233 of the first tube is large so that the momentary drop in anode voltage 234 of the second tube is also large, swinging it sufficiently negative to insure that conduction of the second tube is stopped. With this connection, highly stable action of this circuit is provided over a wide range of operating conditions and circuit values.

The length of the active interval, from instants 235 to 236, during which the first tube conducts and energizes the relay, depends upon the time constant or values of the condenser 223 and resistor 220 so that the active interval may be increased or decreased by adjusting the values of this condenser or resistor. The length of the inactive interval between instants 236 and 237 depends on the time constant or values of the condenser 223 and resistor 219. It is generally desirable to make the inactive interval short as compared with the active interval, which may be accomplished by making the value of the resistor 219 small as compared to that of the resistor 220. The active interval may be, of example, one half of a second, while the inactive interval may be of the order of 0.01 second or less.

Thus I provide a signal light indication for a definite period following the placing of a workpiece in the gauge, when the dimension of the workpiece exceeds a pre-set value. The duration and accuracy of this indication is approximately the same for high speeds of motion of the workpiece in which the measuring interval may be less than 0.001 second, or for lower speeds. With quite low speeds, the indication continues approximately as long as the workpiece is in position for measurement.

Additional circuits of this type provide a similar action at additional dimension limits so that any suitable number of limits may be arranged and preset to suitable values. Then when workpieces are placed in the gauge, an indication is provided which shows the dimension interval, between two successive limits, within which the dimension of each workpiece falls. This indication has a minimum duration of any suitable value and is accurate for any workpiece speed which the gauge spindle is capable of following accurately.

The general action of this arrangement when operating in connection with a gauge or a distance measuring system, is to provide a delay or holding action in the indication of one or more dimensions or distances. In effect, one or more accurate dimension or distance indications are held or prolonged long enough to operate indicating or other equipment. Even though an object is in position for measurement for only a small fraction of a second and the equipment it is desired to operate may require a larger fraction of a second or longer for its operation, such equipment may be reliably operated by the holding or prolonging action of this arrangement.

Other devices, such as power relays, solenoids, motors, etc. may be employed in place of the signal lights or relays illustrated, thus providing means for accurately controlling or operating a wide variety of equipment or machinery in accordance with distance or dimension variations. This control action is substantially independent of the speed of measurement for a wide range of speeds; so that large machines, for example, may be started or stopped or otherwise controlled by distance or dimension changes as small as a few millionths of an inch or less, even when the measurement of such distances or dimensions is of very short duration.

While I have described a gauge of a specific type, it is apparent that many other types of measuring apparatus may be constructed in accordance with this invention by employing suitable members for moving coils relatively in accordance with a value variation which is to be determined, and by utilizing variations or modifications of the measuring system shown.

I claim:

1. Gauge apparatus comprising, a coil mounted on and secured to a spindle, said coil and spindle having a common axis, the spindle being mounted for free movement axially thereof, said movable coil being disposed between and in spaced relation to a pair of fixed coils having axes coinciding with the axis of the movable coil and said movable coil being inductively coupled with said fixed coils; an input circuit to supply said fixed coils with oscillating current having voltage characteristics equal in amplitude and opposite in phase respectively, whereby oscillating current is induced in said movable coil; an output circuit including an amplifier, rectifier and meter for measuring changes in voltage induced in said movable coil by movement of said spindle, and a source of voltage adjustable in phase and magnitude connected to said output circuit to obtain a zero output voltage at any position of said movable coil in relation to said fixed coils and therefore a zero reading on said meter.

2. Gauge apparatus comprising, a coil mounted on and secured to a spindle, said coil and spindle having a common axis, the spindle being mounted for free movement axially thereof, said movable coil being disposed between and in spaced relation to a pair of fixed coils having axes coinciding with the axis of the movable coil and said movable coil being inductively coupled with said fixed coils; an input circuit to supply said fixed coils with oscillating current having voltage characteristics equal in amplitude and opposite in phase, respectively, whereby oscillating current is induced in said movable coil; an output circuit including an amplifier, rectifier and meter for measuring changes in voltage induced in said movable coil by movement of said spindle, and a source of voltage manually adjustable in phase and magnitude connected to said output circuit to obtain a zero output voltage at any position of said movable coil in relation to said fixed coils and therefore a zero reading on said meter.

3. In a gauge, the combination of, an input coil system, an output coil system, means for supplying said input system with current, means mounting one of said systems for movement relative to the other, whereby a measuring voltage is developed in said output coil system, the amplitude of which is a function of the relative displacement between said systems, means for indicating the value of said measuring voltage, and a phase-controlled rectifier responsive to a reversal of the phase of said measuring voltage for preventing the response of said indicating means when the phase reverses and accordingly preventing operation of said indicating means by movement of said one coil system in a region beyond the point of phase reversal.

4. In a gauge, the combination of, an input coil system, an output coil system, means for supplying said input system with current, means mounting one of said systems for movement relative to the other, whereby a measuring voltage is developed in said output coil system the amplitude of which is a function of the relative movement between said systems, an amplifier connected to said output coil system; means for indicating the output of said amplifier, a step attenuator for varying the input to the amplifier by any one of several selectable fixed ratios, thereby to multiply the value of the effect of said relative movement thereby to provide selective ranges of measurement, and a phase-controlled vacuum tube responsive to a reversal in the phase of said measuring voltage for preventing the response of said indicating means when the phase reverses and accordingly preventing operation of said indicating means by movement of said one coil system in a region beyond the point of phase reversal.

5. In a gauge, the combination of, an input coil system comprising a plurality of coils having similar characteristics; an output coil system, means for supplying said input system with alternating current, means mounting one of said systems for movement relative to the other, whereby a measuring voltage is developed in said output coil system the amplitude of which is a function of the relative positions of said systems, and a source of balancing voltage of the same frequency as said alternating current and including an electrical network having a variocoupler for varying the magnitude and phase of the voltage, and an electrical circuit combining said balancing voltage with said measuring voltage at the time the gauge is initially set to the value of a standard condition to adjust the output of said coil systems to a predetermined value.

6. Measuring apparatus comprising an air-core coil mounted for movement along its axis, said movable coil being disposed between and in spaced coaxial relation to a pair of fixed air-core coils having axes coinciding with the axis of the movable coil, and said movable coil being inductively coupled with said fixed coils; a voltage source energizing said fixed coils to produce opposed overlapping magnetic fields, an adjustable load inductively and asymmetrically coupled to said field so that the change in field intensity along a rectilinear path through said fields is a linear function of the displacement from a predetermined point thereon, a mechanical linkage responsive to a change in a condition to effect a distance displacement of said movable coil along said path between said fixed coils defined by the common axis of said fixed and movable coils, the magnitude of said distance displacement being a measure of said change in condition; and an electrical circuit to measure the change in voltage induced in said movable coil by said displacement.

7. Gauge apparatus comprising a first coil system mounted on and secured to a spindle, said coil system and spindle having a common axis, the spindle being mounted for free movement axially thereof, a second coil system disposed coaxially and in spaced relation to said first coil system, a signal source connected to one of said coil systems and supplying oscillating current thereto whereby alternating voltage is induced in the other coil system having a magnitude dependent upon the relative positions of said coil systems, a manually adjustable auxiliary load asymmetrically coupled to said coil systems for modifying the field produced thereby so that said induced oscillating current is a linear function of the magnitude of relative displacement of said systems; an output circuit including an amplifier and meter for measuring changes in voltage induced in said movable coil by displacement of said spindle, and a signal source adjustable in phase and magnitude for applying to the said output circuit a balancing voltage for obtaining a predetermined reference meter indication at any relative position of said coil systems.

8. Measuring apparatus comprising an air-core coil mounted for movement along its axis, said movable coil being disposed between and in spaced relation to a pair of fixed air-core coils, having axes coinciding with the axis of said movable coil and said movable coil being inductively coupled with said fixed coils, means to supply said fixed coils with alternating current having voltage characteristics equal in amplitude and opposite in phase respectively, phase adjusting means including an adjustable non-magnetic element adjacent one of said fixed coils for adjusting the phase of the voltages in said fixed coils, means responsive to a change in a condition to effect a distance displacement of said movable coil in a path between said fixed coils defined by the common axis of said fixed and movable coils, the magnitude of said distance displacement being a measure of said change in condition, and means to measure the change in a voltage induced in said movable coil by said displacement.

9. Measuring apparatus comprising an air-core coil mounted for movement along its axis, said movable coil being disposed between and in spaced relation to a pair of fixed air-core coils, having axes coinciding with the axis of said movable coil and said movable coil being inductively coupled with said fixed coils, means to supply said fixed coils with alternating current having voltage characteristics equal in amplitude and opposite in phase respectively, phase adjusting means including means for varying the effective resistance of one of the fixed coils relative to the other thereby to adjust and accordingly balance the phases of each, means responsive to a change in a condition to effect a distance displacement of said movable coil in a path between said fixed coils defined by the common axis of said fixed and movable coils, the magnitude of said distance displacement being a measure of said change in condition, and means to measure the change in a voltage induced in said movable coil by said displacement.

10. Measuring apparatus comprising an air-core coil mounted for movement along its axis, said movable coil being disposed between and in spaced relation to a pair of fixed air-core coils, having axes coinciding with the axis of said movable coil and said movable coil being inductively coupled with said fixed coils, means to supply said fixed coils with alternating current having voltage characteristics equal in amplitude and opposite in phase respectively, phase adjusting means including a non-magnetic metallic member adjacent each of said fixed coils, means for moving one of said members relative to its coil to adjust the phase of the magnetic field of such fixed coil to that of the other fixed coil, means responsive to a change in a condition to effect a distance displacement of said movable coil in a path between said fixed coils defined by the common axis of said fixed and movable coils, the magnitude of said distance displacement being a measure of said change in condition, and means to measure the change in a voltage induced in said movable coil by said displacement.

11. In a gauge, the combination of an input coil system, an output coil system, means for supplying said input system with current, means mounting one of the said systems for movement relative to the other, whereby a measuring voltage is developed in said output coil system the amplitude of which is a function of the relative movement between said systems, an amplifier connected to said output coil system, phase-controlled means for indicating the output of said amplifier, said phase-controlled means including a rectifier biased to produce an output voltage only for relative movement of said coil system to one side of a neutral position, and a fixed step attenuator associated with said output coil system for varying the value of the measuring voltage by any one of several selectable decimally related fixed ratios thereby to multiply the value of the effect of said relative movement thereby to provide selective ranges of measurement.

12. In a gauge, the combination of an input coil system, an output coil system, means for supplying said input system with current, means mounting one of the said systems for movement relative to the other, whereby a measuring voltage is developed in said output coil system the amplitude of which is a function of the relative movement between said systems, an amplifier connected to said output coil system, phase-controlled means for indicating the output of said amplifier and including a multi-element tube normally biased to cut-off, means for introducing a positive voltage to said tube proportionate to a particular relative movement of said coil systems and operative to obtain conduction through said tube, and a fixed step attenuator associated with said output coil system for varying the value of the measuring voltage by any one of several selectable decimally related fixed ratios thereby to multiply the value of the effect of said relative movement thereby to provide selective ranges of measurement.

13. In a gauge, the combination of an input coil system, an output coil system, means for supplying said input system with current, means mounting one of the said systems for movement relative to the other, whereby a measuring voltage is developed in said output coil system the amplitude of which is a function of the relative movement between said systems, an amplifier connected to said output coil system, phase-controlled means for indicating the output of said amplifier and including a rectifier biased to produce an output voltage only, for relative movement of said coil systems to one side of a neutral position, circuit means operative by said rectifier output voltage to obtain a prolonged indication of any relative movement of said coils, and a fixed step attenuator associated with said output coil system for varying the value of the measuring voltage by any one of several selectable decimally related fixed ratios thereby to multiply the value of the effect of said relative movement thereby to provide selective ranges of measurement.

HAROLD A. SNOW.

REFERENCES CITED

The following references are of record in the file of this patent:

UNITED STATES PATENTS

| Number | Name | Date |
|---|---|---|
| 2,013,106 | Magel | Sept. 3, 1935 |
| 2,083,759 | Temple | June 15, 1937 |
| 2,136,219 | Scherbatskoy | Nov. 8, 1935 |
| 2,240,184 | Hathaway | Apr. 29, 1941 |

FOREIGN PATENTS

| Number | Country | Date |
|---|---|---|
| 335,332 | Great Britain | Sept. 25, 1930 |